US009115663B2

(12) United States Patent
Nicosia et al.

(10) Patent No.: US 9,115,663 B2
(45) **Date of Patent: *Aug. 25, 2015**

(54) VEHICLE CALIBRATION USING DATA COLLECTED DURING NORMAL OPERATING CONDITIONS

(75) Inventors: Tony Nicosia, Brookfield, WI (US); Edward A. Ramberger, Jackson, WI (US); Charles Zellner, Menomonee Falls, WI (US); David Klosterman, Mukwonago, WI (US); John Chapin, Schoolcraft, MI (US); Karl Lingerfelt, Portage, MI (US); Michael Simpson, Kalamazoo, MI (US); Andrew Stampor, Kalamazoo, MI (US)

(73) Assignee: Harley-Davidson Motor Company Group, LLC, Milwaukee, WI (US)

( * ) Notice: Subject to any disclaimer, the term of this patent is extended or adjusted under 35 U.S.C. 154(b) by 736 days.

This patent is subject to a terminal disclaimer.

(21) Appl. No.: 13/528,104

(22) Filed: Jun. 20, 2012

(65) Prior Publication Data

US 2012/0259533 A1 Oct. 11, 2012

Related U.S. Application Data

(63) Continuation of application No. 12/841,569, filed on Jul. 22, 2010, now Pat. No. 8,224,519.

(60) Provisional application No. 61/228,391, filed on Jul. 24, 2009.

(51) Int. Cl.
*G01M 17/00* (2006.01)
*G06F 7/00* (2006.01)
(Continued)

(52) U.S. Cl.
CPC ........ *F02D 41/2422* (2013.01); *F02D 41/2435* (2013.01); *F02D 41/1454* (2013.01); *F02D 41/2409* (2013.01); *F02D 41/34* (2013.01);
(Continued)

(58) Field of Classification Search
None
See application file for complete search history.

(56) References Cited

U.S. PATENT DOCUMENTS

| | | | |
|---|---|---|---|
| 3,969,614 | A | 7/1976 | Moyer et al. |
| 4,166,437 | A | 9/1979 | Bianchi et al. |

(Continued)

FOREIGN PATENT DOCUMENTS

| | | |
|---|---|---|
| JP | H01200033 | 8/1989 |
| JP | H06504348 | 5/1994 |

(Continued)

OTHER PUBLICATIONS

Official Action from the Japan Patent Office for Patent Application No. 2010-166276 dated Nov. 26, 2013 (3 pages).

*Primary Examiner* — Ariel Yu
(74) *Attorney, Agent, or Firm* — Michael Best & Friedrich LLP

(57) ABSTRACT

Systems and methods for optimizing the performance of a vehicle under normal operating conditions. A vehicle system adjusts one or more vehicle operating parameters in a closed-loop in response to data received from sensors. A portable vehicle communication interface module is selectively attached to the vehicle without inhibiting normal operation of the vehicle. When connected to the vehicle, the vehicle communication interface module records the adjustments made by the vehicle system in closed-loop operation. These recorded values are then used to update calibration information that the vehicle system uses as default values.

20 Claims, 6 Drawing Sheets

(51) Int. Cl.
*G06F 19/00* (2011.01)
*F02D 41/24* (2006.01)
*F02D 41/14* (2006.01)
*F02D 41/34* (2006.01)

(52) U.S. Cl.
CPC . *F02D 2200/0406* (2013.01); *F02D 2200/0411* (2013.01); *F02D 2400/11* (2013.01)

(56) References Cited

U.S. PATENT DOCUMENTS

| | | | |
|---|---|---|---|
| 4,212,066 | A | 7/1980 | Carp et al. |
| 4,309,971 | A | 1/1982 | Chiesa et al. |
| 4,322,800 | A | 3/1982 | Hisegawa et al. |
| 4,403,584 | A | 9/1983 | Suzuki et al. |
| 4,404,946 | A | 9/1983 | Hoard et al. |
| 4,594,669 | A | 6/1986 | Hosaka |
| 4,646,697 | A | 3/1987 | Grob et al. |
| 4,676,215 | A | 6/1987 | Blocher et al. |
| 4,730,256 | A | 3/1988 | Niimi et al. |
| 4,903,669 | A | 2/1990 | Groff et al. |
| 5,050,560 | A | 9/1991 | Plapp |
| 5,088,464 | A | 2/1992 | Meaney |
| 5,190,020 | A | 3/1993 | Cho |
| 5,284,116 | A | 2/1994 | Richeson, Jr. |
| 5,318,449 | A | 6/1994 | Schoell et al. |
| 5,948,026 | A | 9/1999 | Beemer, II et al. |
| 6,085,142 | A | 7/2000 | Di Leo et al. |
| 6,250,292 | B1 | 6/2001 | Suhre |
| 6,338,018 | B1 | 1/2002 | Baker |
| 6,363,312 | B1 | 3/2002 | Griffin |
| 6,512,974 | B2 | 1/2003 | Houston et al. |
| 6,626,145 | B2 | 9/2003 | Enoyoshi et al. |
| 6,640,777 | B2 | 11/2003 | Enoyoshi et al. |
| 6,742,502 | B2 | 6/2004 | Nagatsu et al. |
| 6,745,153 | B2 | 6/2004 | White et al. |
| 6,745,620 | B2 | 6/2004 | Kreikemeier et al. |
| 6,820,600 | B1 | 11/2004 | Sisken et al. |
| 6,928,362 | B2 | 8/2005 | Meaney |
| 6,957,136 | B2 | 10/2005 | Tachibana et al. |
| 6,999,869 | B1 | 2/2006 | Gitlin et al. |
| 7,000,589 | B2 | 2/2006 | Matthews et al. |
| 7,073,485 | B2 | 7/2006 | Truscott et al. |
| 7,280,905 | B1 | 10/2007 | Salvisberg |
| 7,369,933 | B2 | 5/2008 | Bowling et al. |
| 7,379,801 | B2 | 5/2008 | Heffington |
| 7,415,389 | B2 | 8/2008 | Stewart et al. |
| 7,546,200 | B2 | 6/2009 | Justice |
| 2008/0114521 | A1 | 5/2008 | Doering |
| 2008/0221752 | A1 | 9/2008 | Jager et al. |
| 2008/0221776 | A1 | 9/2008 | McClellan |
| 2009/0112451 | A1 | 4/2009 | Justice |
| 2009/0118967 | A1 | 5/2009 | Kaiser et al. |

FOREIGN PATENT DOCUMENTS

| | | |
|---|---|---|
| JP | H11353006 | 12/1999 |
| JP | 2001050082 | 2/2001 |
| JP | 2003522900 | 7/2003 |
| JP | 2006234822 | 9/2006 |
| WO | 9209957 | 6/1992 |

| Engine Speed (RPM) \ Throttle Position (%) | 0.0 | 2.3 | 5.0 | 7.3 | 10.0 | 15.0 | 20.0 | 25.0 | 30.0 | 40.0 | 60.0 | 80.0 | 100.0 |
|---|---|---|---|---|---|---|---|---|---|---|---|---|---|
| 750 | 74.0 | 76.0 | 81.0 | 83.0 | 85.0 | 87.0 | 87.0 | 86.0 | 85.0 | 85.0 | 85.0 | 85.0 | 85.0 |
| 1000 | 71.0 | 75.0 | 81.0 | 83.0 | 86.0 | 88.0 | 88.0 | 89.0 | 88.0 | 89.0 | 89.0 | 89.0 | 89.0 |
| 1250 | 67.0 | 72.0 | 82.0 | 86.0 | 89.0 | 92.0 | 93.0 | 94.0 | 95.0 | 97.0 | 97.0 | 97.0 | 97.0 |
| 1500 | 62.0 | 71.0 | 84.0 | 89.0 | 96.0 | 101.0 | 102.0 | 105.0 | 109.0 | 114.0 | 116.0 | 117.0 | 118.0 |
| 1750 | 59.0 | 72.0 | 88.0 | 94.0 | 100.0 | 104.0 | 105.0 | 106.0 | 109.0 | 114.0 | 116.0 | 117.0 | 118.0 |
| 2000 | 57.0 | 69.0 | 85.0 | 92.0 | 98.0 | 101.0 | 103.0 | 103.0 | 101.0 | 101.0 | 101.0 | 101.0 | 101.0 |
| 2250 | 55.0 | 67.0 | 80.0 | 88.0 | 84.0 | 97.0 | 97.0 | 98.0 | 93.0 | 89.0 | 88.0 | 87.0 | 87.0 |
| 2500 | 55.0 | 65.0 | 78.0 | 86.0 | 93.0 | 98.0 | 101.0 | 98.0 | 93.0 | 87.0 | 85.0 | 85.0 | 85.0 |
| 2750 | 55.0 | 64.0 | 77.0 | 85.0 | 92.0 | 102.0 | 105.0 | 106.0 | 104.0 | 102.0 | 101.0 | 101.0 | 101.0 |
| 3000 | 55.0 | 62.0 | 74.0 | 84.0 | 92.0 | 106.0 | 110.0 | 111.0 | 111.0 | 108.0 | 108.0 | 107.0 | 107.0 |
| 3500 | 55.0 | 60.0 | 72.0 | 82.0 | 92.0 | 110.0 | 120.0 | 122.0 | 122.0 | 119.0 | 116.0 | 115.0 | 114.0 |
| 4000 | 55.0 | 60.0 | 71.0 | 80.0 | 88.0 | 108.0 | 123.0 | 126.0 | 124.0 | 117.0 | 114.0 | 113.0 | 113.0 |
| 4500 | 55.0 | 60.0 | 70.0 | 77.0 | 85.0 | 105.0 | 124.0 | 126.0 | 124.0 | 115.0 | 109.0 | 107.0 | 105.0 |
| 5000 | 55.0 | 60.0 | 69.0 | 76.0 | 84.0 | 103.0 | 122.0 | 125.0 | 123.0 | 113.0 | 107.0 | 101.0 | 98.0 |
| 5500 | 55.0 | 60.0 | 69.0 | 75.0 | 83.0 | 101.0 | 120.0 | 124.0 | 120.0 | 112.0 | 105.0 | 97.0 | 94.0 |
| 6000 | 55.0 | 60.0 | 68.0 | 75.0 | 83.0 | 99.0 | 116.0 | 122.0 | 118.0 | 111.0 | 104.0 | 96.0 | 92.0 |
| 6500 | 55.0 | 60.0 | 68.0 | 75.0 | 83.0 | 99.0 | 113.5 | 118.0 | 114.0 | 110.0 | 103.0 | 95.0 | 91.0 |
| 7000 | 55.0 | 60.0 | 68.0 | 75.0 | 83.0 | 99.0 | 113.5 | 116.0 | 114.0 | 110.0 | 103.0 | 95.0 | 91.0 |

*FIG. 3A*

| Engine Speed (RPM) \ Manifold Air Pressure (kPa) | 20 | 30 | 40 | 50 | 60 | 70 | 80 | 90 | 100 |
|---|---|---|---|---|---|---|---|---|---|
| 750 | 13.9 | 13.9 | 13.9 | 13.9 | 13.9 | 13.8 | 13.4 | 12.9 | 12.8 |
| 1000 | 13.9 | 13.9 | 13.9 | 13.9 | 13.9 | 13.8 | 13.4 | 12.9 | 12.8 |
| 1250 | 14.1 | 14.1 | 14.1 | 14.1 | 14.1 | 13.9 | 13.4 | 12.9 | 12.8 |
| 1500 | 14.2 | 14.3 | 14.3 | 14.3 | 14.3 | 14.1 | 13.5 | 12.9 | 12.8 |
| 1750 | 14.2 | 14.4 | 14.4 | 14.4 | 14.3 | 14.1 | 13.5 | 12.9 | 12.8 |
| 2000 | 14.2 | 14.4 | 14.4 | 14.4 | 14.3 | 14.1 | 13.5 | 12.9 | 12.8 |
| 2250 | 14.2 | 14.4 | 14.4 | 14.4 | 14.3 | 14.1 | 13.5 | 12.9 | 12.8 |
| 2500 | 14.2 | 14.4 | 14.4 | 14.4 | 14.3 | 14.1 | 13.5 | 12.9 | 12.8 |
| 2750 | 14.2 | 14.4 | 14.4 | 14.4 | 14.3 | 14.1 | 13.5 | 12.9 | 12.8 |
| 3000 | 14.2 | 14.4 | 14.4 | 14.4 | 14.3 | 14.1 | 13.5 | 12.9 | 12.8 |
| 3500 | 14.2 | 14.4 | 14.4 | 14.3 | 14.2 | 14.0 | 13.5 | 12.9 | 12.8 |
| 4000 | 14.2 | 14.3 | 14.2 | 14.1 | 14.0 | 13.8 | 13.4 | 12.9 | 12.8 |
| 4500 | 14.1 | 14.1 | 14.0 | 13.9 | 13.7 | 13.5 | 13.2 | 12.9 | 12.8 |
| 5000 | 14.0 | 14.0 | 13.9 | 13.7 | 13.5 | 13.2 | 13.0 | 12.8 | 12.8 |
| 5500 | 14.0 | 14.0 | 13.9 | 13.5 | 13.5 | 13.0 | 12.9 | 12.8 | 12.8 |
| 6000 | 14.0 | 14.0 | 13.9 | 13.5 | 13.5 | 13.0 | 12.9 | 12.8 | 12.8 |
| 7000 | 14.0 | 14.0 | 13.9 | 13.5 | 13.5 | 13.0 | 12.9 | 12.8 | 12.8 |

*FIG. 3B*

| VE | Engine Speed (RPM) | Throttle Position (%) |
|---|---|---|
| 90.0 | 1157.0 | 23.0 |
| 106.0 | 3000.0 | 60.0 |
| 108.5 | 4350.0 | 16.5 |
| 107.0 | 4325.0 | 16.3 |
| 51.0 | 4315.0 | 16.4 |
| 108.0 | 4300.0 | 17.0 |
| 89.0 | 1165.0 | 23.0 |
| 91.2 | 1200.0 | 21.0 |
| 87.8 | 1225.0 | 20.0 |
| 109.0 | 3200.0 | 61.0 |
| 107.0 | 3103.0 | 62.0 |

*FIG. 6A*

GROUP 1: 1000-1250 RPM & 20.0-25.0% Throttle

| VE | Engine Speed (RPM) | Throttle Position (%) |
|---|---|---|
| 90.0 | 1157.0 | 23.0 |
| 89.0 | 1165.0 | 23.0 |
| 91.2 | 1200.0 | 21.0 |
| 87.8 | 1225.0 | 20.0 |

GROUP 2: 3000-3250 RPM & 60.0-65.0% Throttle

| VE | Engine Speed (RPM) | Throttle Position (%) |
|---|---|---|
| 106.0 | 3000.0 | 60.0 |
| 109.0 | 3200.0 | 61.0 |
| 107.0 | 3103.0 | 62.0 |

GROUP 3: 4000-4500 RPM & 15.0-20.0% Throttle

| VE | Engine Speed (RPM) | Throttle Position (%) |
|---|---|---|
| 108.5 | 4350.0 | 16.5 |
| 107.0 | 4325.0 | 16.3 |
| 51.0 | 4315.0 | 16.4 |
| 108.0 | 4300.0 | 17.0 |

*FIG. 6B*

VEHICLE CALIBRATION USING DATA COLLECTED DURING NORMAL OPERATING CONDITIONS

RELATED APPLICATIONS

The present application is a continuation of U.S. patent application Ser. No. 12/841,569, filed Jul. 22, 2010, now U.S. Pat. No. 8,224,519, which claims the benefit of U.S. Provisional Application No. 61/228,391, entitled "Method and Apparatus for Automatic Engine Calibration to Optimize Volumetric Efficiency;" filed on Jul. 24, 2009. The entire contents of both above-identified priority applications are incorporated by reference herein.

BACKGROUND

The invention relates generally to the calibration of engine parameters to adjust engine performance to desired levels. More particularly, the invention relates to the calibration of engine parameters to optimize the engine's volumetric efficiency under desired conditions.

Engine performance is often measured by considering a variety of metrics including power output and fuel economy. Depending upon the intended use of a vehicle, different weighting is given to what metrics should be optimized in order to achieve ideal performance. Changes are then made to the vehicle to optimize performance. For example, mechanical changes can be made to the engine or exhaust system of a motorcycle to improve the horsepower provided by the vehicle during racing. However, such mechanical changes can affect the vehicle's ability to efficiently process fuel.

SUMMARY

In one embodiment, the present invention provides systems and methods for optimizing the volumetric efficiency of a vehicle under normal operating conditions. The vehicle system adjusts vehicle parameters such as the amount of fuel provided by the fuel injection system in a closed loop in order to achieve a target air-to-fuel ratio. A portable vehicle communication interface module is selectively attached to the vehicle without inhibiting normal operation of the vehicle. The vehicle is then driven under normal conditions for which the vehicle is being optimized (e.g., on a race course). When connected to the vehicle, the vehicle communication interface module records the adjustments made by the vehicle system. These recorded values are then used to update the calibration table that the vehicle system uses as default values.

By using the portable vehicle communication interface, the calibration data for the vehicle can be updated based on actual, real-world operating conditions. As such, the calibration data no longer needs to be estimated based on performance on the vehicle under controlled conditions, such as a dynamometer.

In another embodiment, the invention provides a method of calibrating a vehicle. The vehicle includes an engine, an engine control unit, a sensor that detects a value of an output parameter, and an actuator that controls the engine according to a value of an input parameter. The method includes transferring data from a vehicle communication interface module to a calibrating computer system. The vehicle communication interface module is selectively attachable to the vehicle and records data received from the vehicle during normal operation of the vehicle. The transferred data includes a plurality of adjusted actuator values and a corresponding combination of engine speed and throttle position for each of the adjusted actuator values. The adjusted actuator values are values that were generated by the engine control unit of the vehicle by accessing a stored data table defining a preset actuator value for each combination of engine speed and a value indicative of throttle position. In various embodiments, the value indicative of throttle position can include a percentage or proportional measure of actual throttle position, throttle control position, or a measured manifold air pressure value. The engine control unit then adjusts the actuator value based on a comparison between a current value of the output parameter as measured by the sensor and a target value.

After the data is transferred, the calibrating computer system determines a number of adjusted actuator values stored to the vehicle communication interface module that correspond to a first combination of engine speed and throttle position. If the number of stored values exceeds a threshold, the calibrating computer system calculates an updated data table entry based on the adjusted actuator values corresponding to the first combination. An updated data table is then transferred to the engine control unit of the vehicle.

In yet another embodiment the invention provides a calibration system for a vehicle. The vehicle to be calibrated stores a calibration table defining a plurality of fuel-injector settings each corresponding to a combination of a range of engine speeds and a range of values indicative of throttle position. The vehicle also operates in a closed-loop mode that adjusts the fuel-injector setting from the calibration table based on an air-to-fuel ratio detected by a sensor. The calibration system includes a vehicle communication interface module and a calibration computer.

The vehicle communication interface module includes a housing and a computer-readable memory. The housing is selectively attachable to the vehicle and, when attached, is supported by the vehicle without restricting normal operation of the vehicle. The computer-readable memory stores data received from the engine control module of the vehicle. The data indicates an adjusted fuel-injector setting and a corresponding combination of a current engine speed and a current throttle position.

The calibration computer is selectively connectable to the vehicle communication interface module and receives data stored to its memory. The calibration computer processes that data and determines if the number of adjusted fuel-injector settings for each of a plurality of combinations of a range of engine speeds and a range of throttle positions. For each combination where the number of stored adjusted values exceeds a threshold, the computer generates an updated calibration table entry for the first combination based on the adjusted fuel-injector settings corresponding to the first combination. An updated calibration table is then transmitted from the computer to the engine control module of the motorcycle. In some embodiments, the vehicle communication interface module is connected to both the computer and the engine control module and the updated calibration table is transmitted from the computer to the engine control module through the vehicle communication interface module.

Other aspects of the invention will become apparent by consideration of the detailed description and accompanying drawings.

BRIEF DESCRIPTION OF THE DRAWINGS

FIG. 3A is an exemplary volumetric efficiency data table used to calibrate the motorcycle of FIG. 1A.

FIG. 3B is an exemplary air-to-fuel ratio data table used to operate the motorcycle in FIG. 1A.

FIG. 6A is a table showing sample values recorded by the vehicle communication interface module of FIG. 1B.

FIG. 6B is a series of tables showing the samples values of FIG. 6A parsed into predefined groups.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1A:
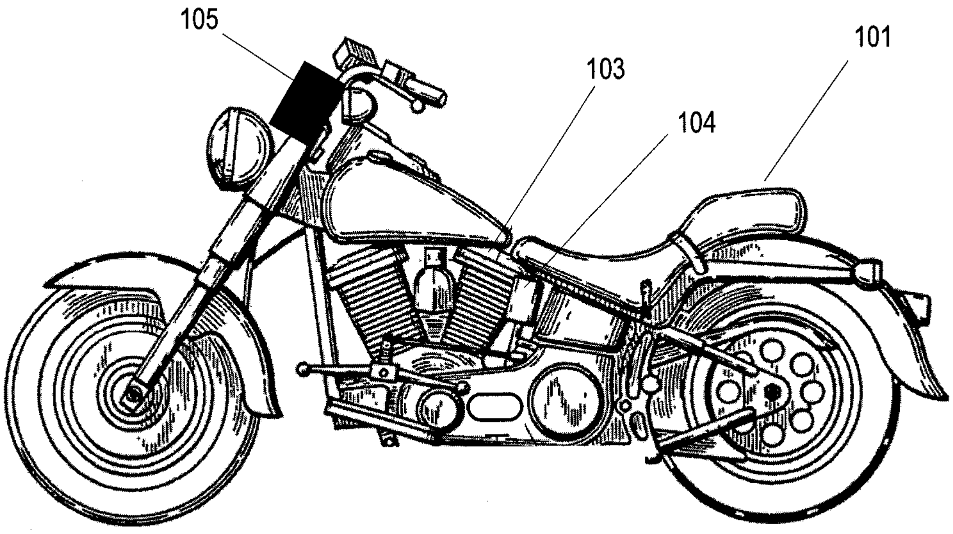
FIG. 1A is a side view of a vehicle, specifically a motorcycle, fitted with a portable vehicle communication interface module according to one embodiment of the invention.

FIG. 1A shows a vehicle, specifically a motorcycle 101, to be calibrated. The systems and methods of calibrating the motorcycle 101 described herein will optimize the performance of the motorcycle for driving under a specific set of conditions. For example, the motorcycle 101 may be calibrated for optimum racing performance. The motorcycle 101 includes an engine 103 and is equipped with an engine control module (ECM) 104. The ECM 104 controls the operation of the engine according to a predefined set of parameters.

A vehicle communication interface module (VCI) 105 is shown attached to the handlebars of the motorcycle 101. The VCI 105 is a portable, detachable device that can be selectively connected to the ECM 104. The VCI 105 can be attached to the handlebars of the motorcycle 101 as shown in FIG. 1A using cables, straps, or any other appropriate fastener. Furthermore, in some embodiments, a docking cradle can be installed on the motorcycle 101 and the VCI 105 can be attached to the motorcycle 101 by connecting the VCI 105 to the docking cradle, which may be located elsewhere on the motorcycle 101.

When attached to the motorcycle 101, the VCI 105 is communicatively coupled to the ECM 104. Data is transmitted from the ECM 104 to the VCI 105 and stored to the internal memory of the VCI 105. This data is indicative of performance characteristics of the motorcycle 101 and may include data generated by sensors installed in the vehicle engine or data indicative of adjustments made by the ECM 104 during operation as described in further detail below. The VCI 105 is discretely sized so that it can be attached to the motorcycle 101 without interfering with the normal operation of the vehicle. The motorcycle 101 can be driven in an environment, such as a race course, while the VCI 105 is attached. As such, the VCI 105 is able to capture vehicle performance data under real-world conditions without requiring a simulated environment such as a dynamometer.

Although the VCI 105 is capable of collecting such performance data while the motorcycle 101 is being operated under real-world conditions, such as a race track, the VCI 105 can also be used to collect data when the motorcycle 101 is operated on a dynamometer. In such cases, the VCI 105 can be connected to both the ECM 104 and the calibration computer 203 (described below) to act as a pass-through interface which provides data that is stored directly to the calibration computer 203.

Figure 1B:
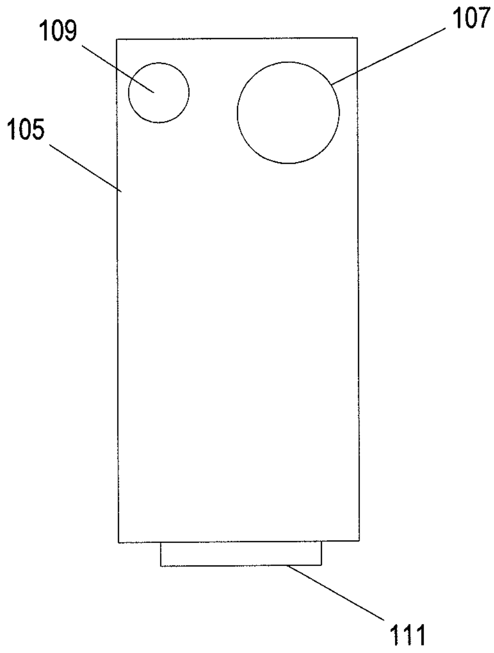
FIG. 1B is a side view of the vehicle communication interface module of FIG. 1A.

As illustrated in FIG. 1B, the VCI 105 includes a button 107, a light-emitting diode 109, and an interface connector 111. The button 107 can be pressed by the user to initiate a recording mode as described below. The LED 109 provides information about the operating status of the VCI 105. For example, if the LED 109 is lit a solid color, this indicates that the VCI 105 is correctly attached to the ECM 104, is active, and receiving data from the ECM 104. If the LED 109 is blinking, this may indicate that the memory of the VCI 105 is full, that the stored data must be transferred to a different device, and that the memory reset before additional data can be saved on the VCI 105. The interface connector 111 connects the VCI 105 to the ECM 104 either directly or through a cable. The VCI 105 can also be connected to a calibration computer through the interface connector 111. As described below, the calibration computer analyzes the data stored on the VCI 105 and updates the calibration data tables that are used by the motorcycle 101. In some embodiments, the VCI 105 includes only a single interface connector 111 that can be used to connect to only one of the ECM 104 and the calibration computer at any given time. In other embodiments, the VCI 105 includes multiple interface connectors. The interface connector(s) 111 can be a standard or proprietary connection type including, but not limited to, USB, CAT-5, and RS-232.

Figure 2:
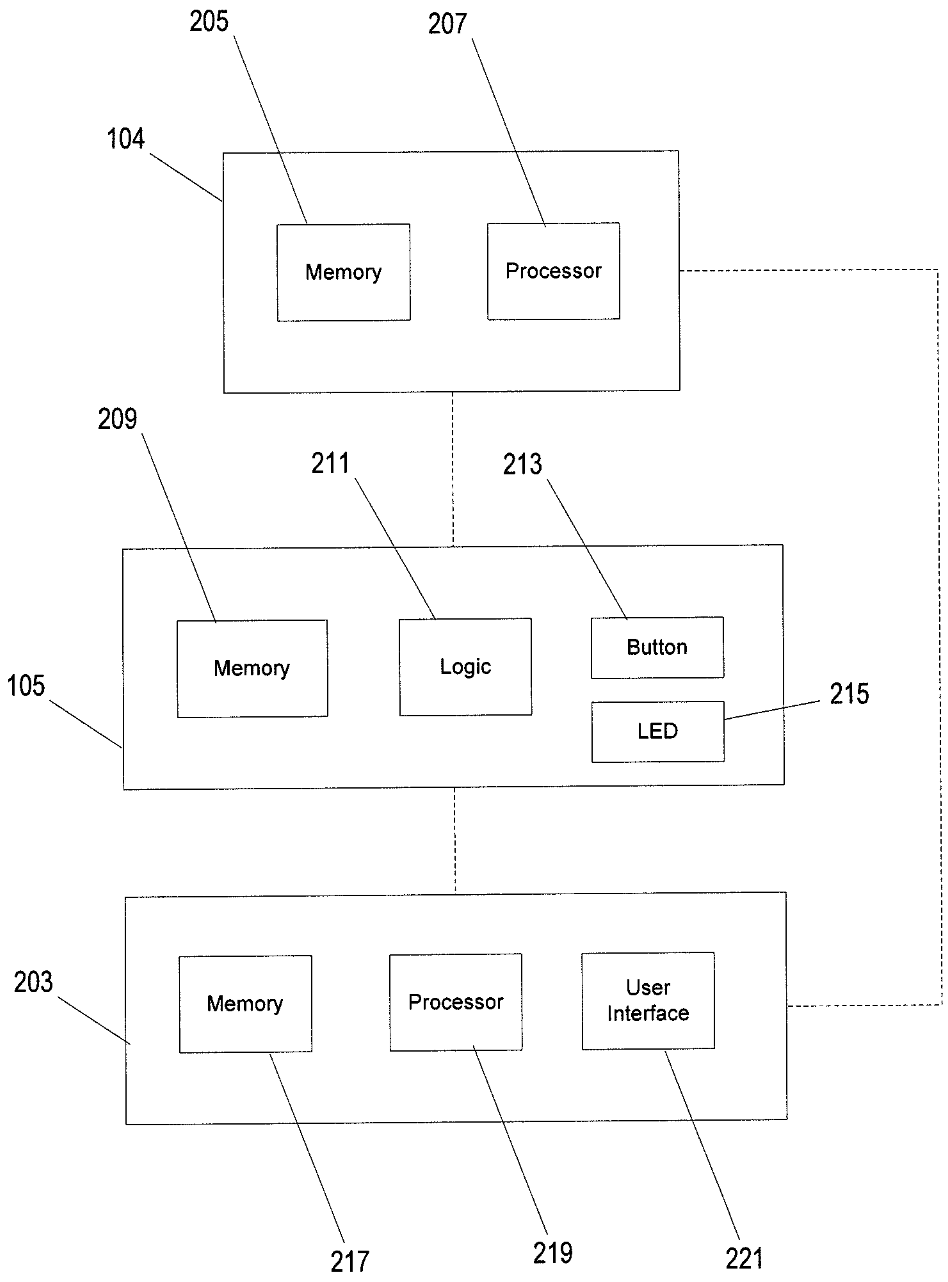
FIG. 2 is a schematic view of a system for calibrating the engine of the motorcycle of FIG. 1A.

FIG. 2 provides a schematic illustration of portions of the components that communicate with each other in order to calibrate the motorcycle 101. As described above, the ECM 104 is selectively connectable to the VCI 105 and transmits data to the VCI 105 through an interface connector. The VCI 105 is also selectively connectable to a calibration computer 203. The calibration computer 203 executes a software application that analyzes the data recorded to the VCI 105 and generates updated data tables for use during operation of the motorcycle 101. In some embodiments, the calibration computer 203 is selectively connectable to the ECM 104 and, when connected, the calibration computer 203 transmits data, including updated data tables, to the ECM 104.

In some embodiments, the calibration computer 203 is connected directly to the ECM 104 when data is to be transmitted to the ECM 104. In other embodiments, the calibration computer 203 is connected to the ECM 104 through the VCI 105, which acts as a pass-through interface for transmitting data from the calibration computer 203 to the ECM 104. In some embodiments, the updated data tables transmitted from the calibration computer 203 are stored on both the ECM 104 and the VCI 105.

The ECM 104 includes a memory 205 that stores predefined parameters that are used to control the operation of the motorcycle 101. The memory 205 also stores instructions that are executed by a processor 207 to control the operation of the engine 103. The VCI 105 includes a memory for storing performance data received from the ECM 104 and, as described above, a button 107 and a LED 109. The VCI 105 also includes logic that controls the operation of the LED 109 and manages the storage of data received from the ECM 104.

The calibration computer 203, in one embodiment, is a desktop computer that includes a memory 217, a processor 219, and a user interface 221. The user interface 221 includes a keyboard, a mouse, and a monitor. The calibration computer 203 runs a software package such as the SCREAMIN' EAGLE PRO SUPER TUNER™ package offered by HARLEY-DAVIDSON®. The software package processes the data recorded to the VCI 105 and also communicates updated calibration information to the ECM 104. Although the calibration computer 203 in this example is a standard desktop computer, the calibration computer, in other embodiments, can be a device designed specifically for calibration and tuning operations such as those described herein.

As described above, the ECM 104 stores predefined parameters that are used to control the operation of the engine 103 of the motorcycle 101. FIGS. 3A and 3B illustrate two data tables that are stored to the ECM 104. The table of FIG. 3A defines at target volumetric efficiency for each combination of engine speed and throttle position. Volumetric efficiency refers to a percentage of what quantity of fuel and air enters a cylinder of the engine as compared to the capacity of the cylinder. Because the amount of air provided to the engine is fixed based on the throttle position, the volumetric efficiency at a given throttle position can be modified by varying the amount of fuel provided by the fuel injectors.

The ECM 104 uses the volumetric efficiency value stored in the table and the known throttle position to determine how much fuel to provide to the engine through the fuel injection system. Although the table of FIG. 3A is defined by matching one engine speed setting to one throttle position setting, the values are intended to represent ranges. For example, to determine the amount of fuel to provide to an engine that is operating at 1600 RPM when the throttle control is positioned at 22%, the system identifies the appropriate value range (i.e., 1500 RPM and 20% throttle). Under such conditions, the target volumetric efficiency for the engine is 102.0. Based on this value, the ECM determines how much fuel to provide to the engine through the fuel injection system.

In other embodiments, the ECM 104 uses the data from the table of FIG. 3A, the engine speed, and the throttle position to calculate a more specific volumetric efficiency value. For example, if the engine is operating at 1750 RPM and the throttle position is at 22%, the ECM 104 will calculate a volumetric efficiency value between 105.0 and 106.0. This is because the 22% throttle position falls between the 20% and 25% values defined by the table which correspond to volumetric efficiency values of 105.0 and 106.0, respectively.

Similarly, although the data table of FIG. 3A defines volumetric efficiency values based on combinations of engine speed and throttle position, in other embodiments, the table can define the volumetric efficiency based on other combinations of engine performance. For example, instead of determining throttle position as a percentage, some system may define the X-axis of the table in terms of a measured manifold air pressure (as illustrated in the table of FIG. 3B). In still other systems, the throttle position value can be replaced with a position value corresponding to the twist-grip throttle control.

The data table of FIG. 3B defines a target air-to-fuel ratio for each combination of engine speed and manifold air pressure. The manifold air pressure is measured by a sensor positioned in the engine. The air-to-fuel ratio is determined by the amount of oxygen detected by a sensor positioned in the exhaust of the motorcycle. Because the amount of fuel injected into the engine will affect the air-to-fuel ratio, the air-to-fuel ratio defined in the data table of FIG. 3B is related to the volumetric efficiency as defined in the data table of FIG. 3A for a given engine speed and throttle position.

Figure 4:
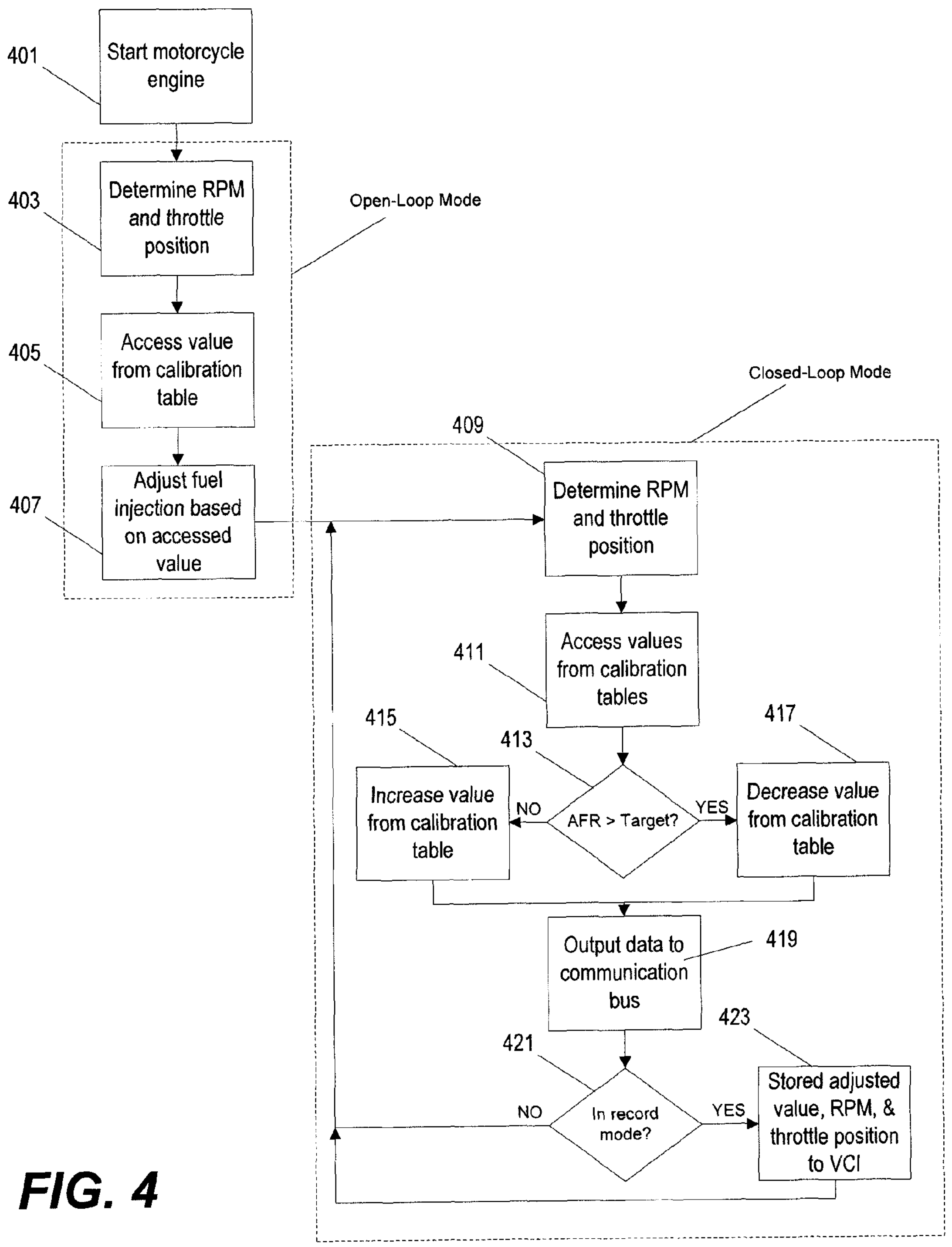
FIG. 4 is a flowchart illustrating a method of operating the motorcycle of FIG. 1A using the data tables of FIGS. 3A and 3B and the vehicle communication interface module of FIG. 1B.

The ECM 104 adjusts the volumetric efficiency value when operating in a closed-loop mode in order to achieve the target air-to-fuel ratio. As such, when operating in closed-loop mode, the volumetric efficiency defined in the data table of FIG. 3A is used by the ECM 104 as a starting point and is adjusted up or down as necessary to achieve the target air-to-fuel ratio. These adjustments are recorded to the VCI 105 when it is attached to the ECM 104 and are used to generate an updated version of the data table of FIG. 3A to be used by the ECM 104. FIG. 4 illustrates a method of operating the ECM 104 in both open-loop and closed-loop mode and for recording adjustments to the defined volumetric efficiency value to the VCI 105.

When the motorcycle 101 is started (step 401) it initially enters into an open-loop operating mode. The ECM 104 determines the engine speed and the position of the throttle (step 403) and accesses the data table of FIG. 3A in order to identify the target volumetric efficiency (step 405). The ECM 104 then adjusts the fuel injection based on the accessed value (step 407). The steps in the open-loop mode are repeated until a set of defined parameters is satisfied. Then the ECM 104 begins operating in a closed-loop mode. The set of defined parameters can include, but is not limited to, one or more of the following: a defined period of time, a battery voltage, a minimum engine speed, and a minimum vehicle speed.

When the ECM 104 enters the closed-loop mode, it begins to adjust the values accessed from the stored volumetric efficiency table based on a comparison between the observed air-to-fuel ratio and the target air-to-fuel ratio as defined in the data table of FIG. 3B. In this embodiment, the ECM 104 does not overwrite the values stored in the volumetric efficiency table with the updated values. The ECM 104 again determines the engine speed and throttle position (step 409) and accesses the target volumetric efficiency from the data table (step 411). However, when in closed-loop mode, the ECM 104 also compares an observed air-to-fuel ratio to a target air-to-fuel ratio as defined by the data table of FIG. 3B (step 413). If the air-to-fuel ratio is too low, the volumetric efficiency value is increased accordingly (step 415). If too high, the volumetric efficiency value is decreased accordingly (step 417).

Various techniques can be used to determine how much the volumetric efficiency value should be adjusted including, but not limited to, implementing a proportional-integral-derivative (PID) controller or other mathematical calculation. However, in this embodiment, the volumetric efficiency value is adjusted proportionately to the difference between the air-to-fuel ratio and the target. For example, if the air-to-fuel ratio is 10% lower than the target, the volumetric efficiency is increased by 10%.

After adjusting the volumetric efficiency value, the ECM 104 outputs the adjusted value to a communication bus (step 419). When the VCI 105 is connected to the ECM 104, the VCI 105 detects the data on the communication bus. If the record mode of the VCI 105 has been activated (step 421), the ECM stores the adjusted volumetric efficiency value, the current engine speed, and the current throttle position to the VCI 105 (step 423) before repeating the closed-loop operation and continuing to store additional data. If not, the adjustment value is not recorded and the ECM returns to the beginning of the closed-loop (step 409).

Figure 5:
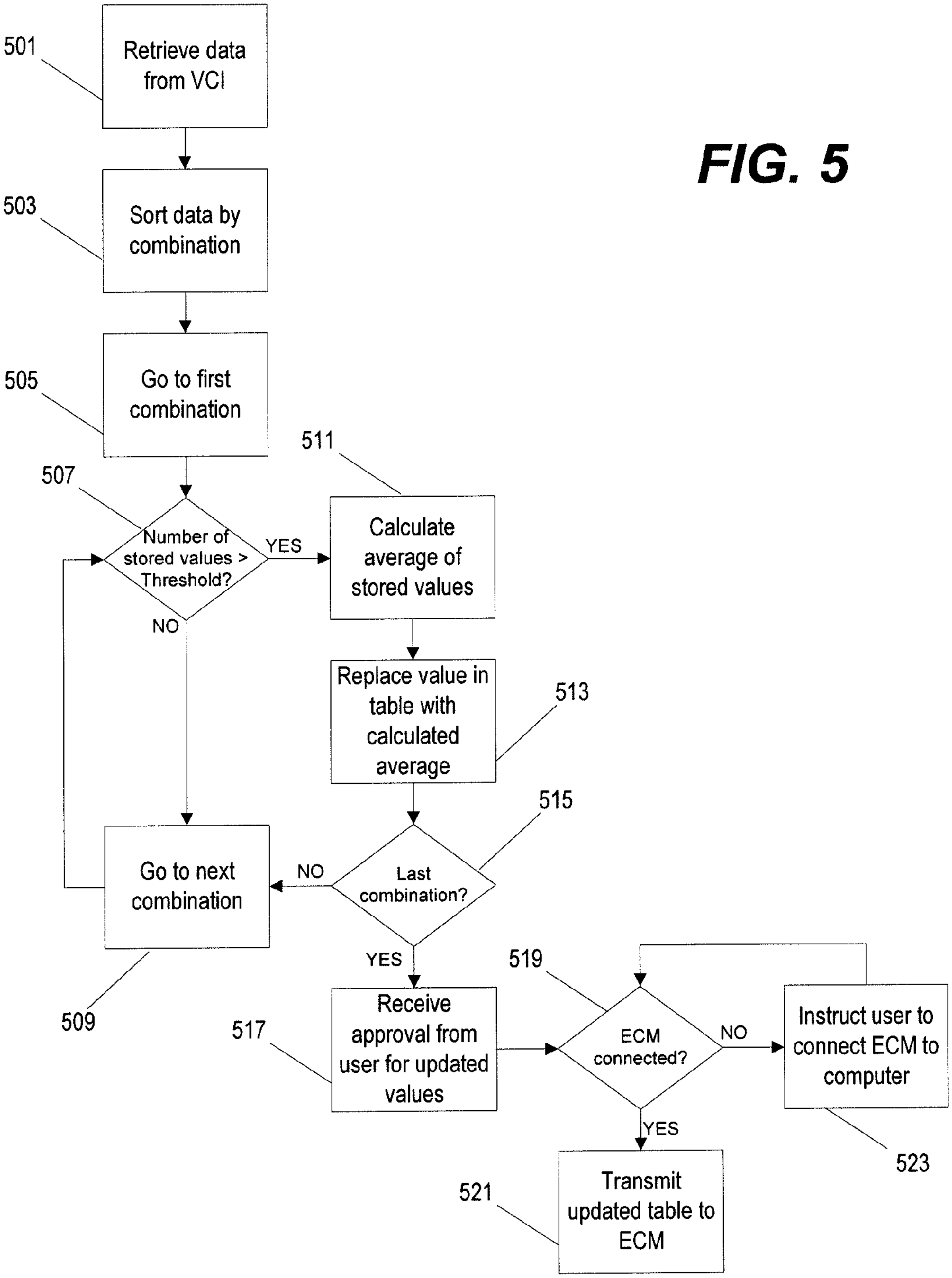
FIG. 5 is a flowchart illustrating a method of updating the volumetric efficiency data table of FIG. 3A based on data recorded by the vehicle communication interface module of FIG. 1B.

The data stored to the VCI 105 is then used by the calibration computer 203 to update the data table of FIG. 3A. As illustrated in FIG. 5, after the VCI 105 is connected to the calibration computer 203, the calibration computer 203 copies all of the recorded data to a local memory device (step 501). The calibration computer 203 then sorts the data by the combination of engine speed and throttle position (step 503). For example, all adjusted values that were recorded when (1)

the engine speed was between 750 and 1000 RPM and (2) the throttle position was between 0.0 and 2.2% are sorted into the first group.

Before changing a value on the data table, the calibration computer 203 determines whether sufficient data was collected. After the data has been parsed into the appropriate groupings, the calibration computer 203 begins by examining the first groups (e.g., all adjusted values recorded when the engine speed was between 750 and 1000 RPM and the throttle position was between 0.0 and 2.2%) (step 505). If the number of stored values for the first group is less than a defined threshold (step 507), the calibration computer proceeds to the next group without changing the value in the data table (step 509).

If, however, the number of stored values for the group is greater than the threshold, the calibration computer 203 calculates an average of the stored values for that group (step 511) and replaces the value in the table for that group with the calculated average value (step 513). The calibration computer 203 repeats this process of evaluation and replacement until all of the groups in the data table have been considered. When the calibration computer reaches the last group (step 515), the user is prompted to approve or reject one or more of the proposed changes to the data table (step 517). As such, if a value appears to change drastically, a user might assume that an inaccurate outlier value is responsible for the change and decline to update the data table for that value.

After the updated data table has been approved by the user, the calibration computer 203 determines whether the ECM 104 is connected. If so, the updated data table is transmitted from the calibration computer 203 to the ECM 104 and stored (step 521). If the ECM 104 is not connected, the calibration computer 203 instructs the user to properly connect the ECM 104. After the data table has been updated, the ECM 104 uses the updated data table when operating the motorcycle 101 in open or closed-loop mode as illustrated in FIG. 4. The calibration computer 203 can be connected directly to the ECM 104 or can be connected to the ECM 104 through the VCI 105.

FIG. 6A provides an example of values that might be stored to the VCI 105 during the operation of the motorcycle 101 according to the method of FIG. 4. After parsing the recorded data into groups (FIG. 5, step 503), the data is sorted as illustrated in FIG. 6B. For this example, the threshold of values required before overwriting volumetric efficiency value in the data table of FIG. 3A is four. As shown in Group 1, four adjusted volumetric efficiency values were recorded while the engine was operating between 1000 and 1250 RPM and the throttle was set between 20% and 25%. Based on these values, the calibration computer 203 calculates an average of 89.5 and uses that value to replace the value 88.0, which was assigned to this combination of engine speed and throttle position in the data table of FIG. 3A.

Only three values were recorded while the engine was operating between 3000 and 3250 RPM and the throttle was set between 60.0% and 65.0%. Because this number does not exceed the threshold (i.e., four), the value for this combination of engine speed and throttle position is not overwritten in the data table of FIG. 3A.

Four values were recorded while the engine was operating between 3000 and 3250 RPM and the throttle was set between 15.0% and 20.0%. As such, the calibration computer 203 calculates an average of 93.6 (FIG. 5, step 511) and recommends changing the value of 106.0 currently in the data table of FIG. 3A (FIG. 5, step 513). However, a user may notice that this recommended change is significantly different from the previous value. This difference is caused by an outlier measurement. Because of the large difference, the user can decline to change this value in the data table and approve only the change proposed for the first group (step 517). After the data table is updated, it is transmitted from the calibration computer 203 to the ECM 104 and subsequently used during the operation of the motorcycle 101.

It is to be noted that, unless explicitly stated otherwise in the claims, the intended scope of the invention extends beyond the specific examples described above. For example, although the examples above describe a system that monitors adjusted volumetric efficiency values during real-world operating conditions, the invention could be applied to monitor other values that are adjusted by the ECM when operating in a closed-loop mode. Similarly, although the interfaces between the various components of the system (e.g., the VCI, the ECM, and the calibration computer) are described as selectively connectable wired connections, other embodiments might utilize wireless connections as a communication interface between the components. Various features and advantages of the invention are set forth in the following claims.

What is claimed is:

1. A method of calibrating a vehicle, the vehicle including an engine, an engine control unit, a sensor that detects a value of an output parameter, and an actuator that controls the engine accordingly to a value of an input parameter, the method comprising:

receiving data from a vehicle communication interface module at a calibrating computer system, the vehicle communication interface module being selectively attachable to the vehicle and recording data received from the vehicle during normal operation of the vehicle, the data including a plurality of adjusted actuator values and a corresponding combination of engine speed and a value indicative of throttle position for each of the plurality of adjusted actuator values, each adjusted actuator value having been generated by the engine control unit;

determining, by the calibrating computer system, a number of adjusted actuator values stored to the vehicle communication interface corresponding to a first combination of engine speed and the value indicative of throttle position;

when the number of adjusted actuator values for the first combination is greater than a threshold, generating, by the calibrating computer system, an updated data table entry for the first combination based on the adjusted actuator values corresponding to the first combination; and transferring an updated data table, including the updated data table entry for the first combination, to the engine control unit after generating the updated data table.

2. The method of claim 1, further comprising operating the engine of the vehicle in a closed-loop mode, the closed-loop mode including determining a current engine speed, determining a current value indicative of throttle position, accessing an actuator value corresponding to the current engine speed and the current throttle position from a data table, the data table defining a plurality of preset actuator values each corresponding to a combination of engine speed and a value indicative of throttle position, receiving the current value of the output parameter from the sensor, comparing the current value of the output parameter to the target value, adjusting the actuator value based on the comparison between the current value of the output parameter and the target value, operating the actuator using the adjusted actuator value as the value of the input parameter, and recording the adjusted actuator value, the current engine speed, and the current value indicative of throttle position to a detachable vehicle communication interface module that is attached to the vehicle; and repeating the act of operating the engine in the closed-loop mode while the vehicle is being driven.

3. The method of claim 1, wherein the generating the updated data table entry includes calculating an average of the adjusted actuator values corresponding to the first combination.

4. The method of claim 1, further comprising:

automatically identifying, by the calibrating computer system, one or more additional combinations of engine speed and value indicative of throttle position where a number of corresponding adjusted values stored on the vehicle communication interface module exceeds a threshold;

calculating an average of the corresponding adjusted values for each identified additional combination; and storing the value in the updated data table for each identified additional combination with the corresponding calculated average.

5. The method of claim 1, wherein the sensor is positioned in an exhaust system of the vehicle, and wherein the output parameter is an air-to-fuel ratio measured by the sensor.

6. The method of claim 5, wherein the vehicle further includes a fuel injection system including the actuator, and wherein the input parameter is indicative of an amount of fuel provided by the fuel injection system.

7. The method of claim 5, wherein the input parameter is a target volumetric efficiency value that is interpreted by the engine control unit to determine an amount of fuel to be provided by the fuel injection system.

8. The method of claim 1, wherein the vehicle communication interface module includes a housing, a memory, and a button, and wherein the actuator values are only recorded to the vehicle communication interface module after the button has been pressed.

9. The method of claim 1, wherein the sensor, and the actuator correspond to a first cylinder of the engine, wherein the vehicle further includes a second sensor and a second actuator corresponding to a second cylinder of the engine, and wherein the method further comprises generating a second updated data table based on a plurality of adjusted second actuator values recorded to the vehicle communication interface module.

10. The method of claim 1, wherein the engine speed and the throttle position corresponding to each of the plurality of actuator values stored in the updated data table includes a range of engine speeds and a range of values indicative of throttle position.

11. The method of claim 1, wherein the generating the updated data table includes allowing the user to accept or decline a proposed change to the actuator value for the first combination.

12. The method of claim 1, wherein the value indicative of throttle position is a manifold air pressure value.

13. The method of claim 1, wherein the value indicative of throttle position is a percentage value indicating a relative position of the throttle.

14. A calibration system for a vehicle, the vehicle including an engine control module that stores a calibration table defining a plurality of fuel-injector settings each corresponding to a combination of a range of engine speeds and a range of values indicative of throttle position, and operates the vehicle in an closed-loop mode that adjusts the fuel-injector setting from the calibration table based on an air-to-fuel ratio detected by a sensor, the calibration system comprising:

a vehicle communication interface module that is selectively connectable to the engine control module, the vehicle communication interface module including a housing that is selectively attachable to the vehicle and that, when attached to the vehicle, is supported by the vehicle without restricting normal operation of the vehicle, and a first computer-readable memory that stores the data received from the engine control module including a plurality of adjusted fuel-injector settings and a corresponding combination of engine speed and a value indicative of throttle position for each of the plurality of adjusted fuel-injector settings; and a calibration computer system that is selectively connectable to the engine control module and the vehicle communication interface module, the calibration computer system including a processor, and a second computer-readable memory storing instructions that, when executed by the processor, cause the calibration computer system to receive data stored on the first computer-readable memory of the vehicle communication interface module, determine a number of adjusted fuel-injector settings stored on the first computer-readable memory corresponding to a first combination of engine speed and the value indicative of throttle position, when the number of adjusted fuel-injector settings corresponding to the first combination is greater than a threshold, generate an updated calibration table entry based on the adjusted fuel-injector settings corresponding to the first combination, and transmit an updated calibration table, including the updated calibration table entry, to the engine control module when the engine control module is connected to the calibration computer system.

15. The calibration system of claim 14, wherein the vehicle communication interface includes a button and is configured to record adjusted fuel-injector settings received from the engine control module only after the button has been pressed.

16. The calibration system of claim 14, wherein the first computer-readable memory of the vehicle communication interface module stores adjusted fuel-injector settings received from the engine control module for each of a first cylinder and a second cylinder of the engine.

17. The calibration system of claim 16, wherein the instructions, when executed by the processor, further cause the calibration computer system to determine a number of adjusted fuel-injector settings for the second cylinder stored on the first computer-readable memory corresponding to a second combination of engine speed and throttle position, when the number of adjusted fuel-injector settings for the second cylinder corresponding to the second combination is greater than a threshold, generate an updated second calibration table by calculating an updated fuel-injector setting based on the adjusted fuel-injectors settings for the second cylinder corresponding to the first combination, and transmit the updated second calibration table to the engine control module when the engine control module is connected to the calibration computer system.

18. The calibration system of claim 14, wherein the instructions, when executed by the processor, further cause the calibration computer system to receive a selection from a user either accepting or declining a proposed change to the fuel-injector setting for the first combination.

19. The calibration system of claim 14, wherein the value indicative of throttle position is a manifold air pressure value.

20. The calibration system of claim 14, wherein the value indicative of throttle position is a percentage value indicating a relative position of the throttle.

* * * * *